(12) United States Patent  
Baehr

(10) Patent No.: US 9,763,125 B2  
(45) Date of Patent: Sep. 12, 2017

(54) MEASURING DEVICE AND MEASURING METHOD RETROACTIVELY CHECKING PRECONDITIONS

(71) Applicant: Rohde & Schwarz GmbH & Co. KG, Munich (DE)

(72) Inventor: Jonas Baehr, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 148 days.

(21) Appl. No.: 14/682,865

(22) Filed: Apr. 9, 2015

(65) Prior Publication Data

US 2016/0227423 A1 Aug. 4, 2016

Related U.S. Application Data

(60) Provisional application No. 62/109,131, filed on Jan. 29, 2015.

(51) Int. Cl.
*H04L 1/00* (2006.01)
*H04W 24/08* (2009.01)
*H04L 5/00* (2006.01)

(52) U.S. Cl.
CPC ............... *H04W 24/08* (2013.01); *H04L 5/00* (2013.01)

(58) Field of Classification Search
None
See application file for complete search history.

(56) References Cited

U.S. PATENT DOCUMENTS

| 7,826,435 | B1* | 11/2010 | Wu | ................. H04W 52/42 370/335 |
| 2010/0273520 | A1* | 10/2010 | Pelletier | ............... H04L 5/0007 455/522 |
| 2012/0320764 | A1* | 12/2012 | Callender | ........... H04L 41/0896 370/252 |

(Continued)

OTHER PUBLICATIONS

"Tdoc R5-144287: Relative power tolerance test for CA", 3GPP TSG-RAN5 Meeting #64, Dresden, Germany, Aug. 18-22, 2014, 7 pages.

*Primary Examiner* — Kwang B Yao
*Assistant Examiner* — Juvena Loo
(74) *Attorney, Agent, or Firm* — Lee & Hayes, PLLC

(57) ABSTRACT

A measuring device serves the purpose of performing measurements of a measuring signal generated by a device under test. The measuring signal uses carrier aggregation of at least a first carrier and a second carrier. The measuring device comprises a high-frequency unit adapted to receive the measuring signal comprising the first carrier and the second carrier and a control unit. The control unit comprises a measuring unit adapted to perform measurements on the received measuring signal. While performing these measurements, it is assumed that an alignment of a power of the first carrier and a power of the second carrier is present. Moreover, the control unit comprises a power alignment determination unit adapted to determine, based upon results of the measurements of the measuring unit, whether the power of the first carrier and the power of the second carrier are in alignment. The control unit is adapted to discard at least some of the results of the measurements, if a lack of alignment of the power of the first carrier and the power of the second carrier is determined by the power alignment determination unit.

14 Claims, 3 Drawing Sheets

(56) References Cited

U.S. PATENT DOCUMENTS

| | | | |
|---|---|---|---|
| 2013/0265892 A1* | 10/2013 | Fernando | H04L 5/001 370/252 |
| 2014/0113675 A1* | 4/2014 | Scholand | H04W 52/16 455/522 |
| 2014/0355457 A1* | 12/2014 | Huang | H04W 24/10 370/252 |

* cited by examiner

_US 9,763,125 B2_

MEASURING DEVICE AND MEASURING METHOD RETROACTIVELY CHECKING PRECONDITIONS

TECHNICAL FIELD

The invention relates to a measuring device and a measuring method, which measure different parameters of measuring signals generated by a device under test.

BACKGROUND ART

In recent years, communication standards using carrier aggregation have come into use. When testing devices emitting signals comprising carrier aggregation, it is necessary to have defined conditions regarding the power transmitted by the carriers.

The document "Tdoc R5-144287: Relative power tolerance test for CA", 3GPP TSG-RAN5 Meeting #64, Dresden, Germany, 18-22 Aug. 2014, shows an exemplary test procedure. In a first step, the alignment of the power of the carriers of the measuring signal is measured. In case, they are not identical, the power of at least one of the carriers is adjusted by instructing the device under test to perform an according adjustment. The effect of this measure is then checked by measuring the transmitted power of the carriers again. This procedure is repeated, until the powers of the carriers are sufficiently identical. Only after performing this power alignment, the actual measurements are performed.

In practice though, this approach is extremely time-consuming, since the iterative power alignment consumes a very long time period in comparison to the actual measurements.

Accordingly, one object of the invention is to provide a measuring device and a measuring method which allow for an accurate measurement while consuming only a small time period.

SUMMARY OF THE INVENTION

According to one aspect of the invention, the measuring device serves the purpose of performing measurements of a measuring signal generated by a device under test. The measuring signal uses carrier aggregation of at least a first carrier and a second carrier. The measuring device comprises a high-frequency unit adapted to receive the measuring signal comprising the first carrier and the second carrier and a control unit. The control unit comprises a measuring unit adapted to perform measurements on the received measuring signal. While performing these measurements, it is assumed that an alignment of a power of the first carrier and a power of the second carrier is present. Moreover, the control unit comprises a power alignment determination unit adapted to determine, based upon results of the measurements of the measuring unit, whether the power of the first carrier and the power of the second carrier are in alignment. The control unit is adapted to discard at least some of the results of the measurements, if a lack of alignment of the power of the first carrier and the power of the second carrier is determined by the power alignment determination unit. It is thereby possible to perform measurements independent of the power alignment determination. A great deal of measuring time thereby can be saved.

Preferably, the measuring unit is adapted to perform further measurements on the received measuring signal while the power alignment determination unit is adapted to determine if the power of the first carrier and the power of the second carrier are in alignment, based upon the measuring results. By performing the measuring and the determining in parallel, a great deal of time can be saved.

Preferably, the control unit is adapted to discard all results of measurements, which have been performed after the measurements based upon which the power alignment determination unit has last determined no lack of alignment of the power of the first carrier and the power of the second carrier, if a lack of alignment of the power of the first carrier and the power of the second carrier is determined by the power alignment determination unit. Thereby, retroactively, measuring results are invalidated, if it is determined that the power alignment criterion is not met. Erroneous measuring results can thereby be prevented.

Preferably, the measuring unit is adapted to perform the measurements without the measuring device having any prior information regarding the alignment of the power of the first carrier and the power of the second carrier. Especially, in this case, great time savings are possible, since an initial aligned state does not have to be reached before the actual measurements can be started.

Preferably, the control unit is adapted to iteratively perform a power alignment of the power of the first carrier and the power of the second carrier, if a lack of alignment of the power of the first carrier and the power of the second carrier is determined by the power alignment determination unit. Therefore, a power alignment is only performed if necessary, but not automatically performed in any case. Especially in cases, in which a power alignment is already present, a great deal of time can be saved.

Preferably, the measuring device further comprises a communication unit adapted to transmit commands to the device under test. The control unit then further comprises a power alignment unit. The control unit is in this case adapted to iteratively perform a power alignment of the power of the first carrier and the power of the second carrier, if a lack of alignment of the power of the first carrier and the power of the second carrier is determined by the power alignment determination unit, by repeatedly determining an increase or decrease of the power of the first carrier and/or the power of the second carrier necessary to achieve an alignment of the power of the first carrier and the power of the second carrier, instructing the device under test, by use of the communication unit, to perform the determined increase or decrease of the power of the first carrier and/or the power of the second carrier, determining by the power alignment determination unit, if the power of the first carrier and the power of the second carrier are in alignment, until an alignment of the power of the first carrier and the power of the second carrier is determined by the power alignment determination unit. By this iterative approach, a very high accuracy of power alignment can be reached, while only a minimal time duration is needed.

Preferably, the power alignment determination unit is adapted to determine, if the power of the first carrier and the power of the second carrier are in alignment, each time a number N of measurements have been performed by the measuring unit. Thereby, only after a certain time duration, the time and computation consuming stamp of checking the power alignment is performed. A further decrease of measuring time duration can thereby be achieved.

Preferably, the number N of measurements, after which the power alignment determination unit is adapted to determine, if the power of the first carrier and the power of the second carrier are in alignment, is pre-specified, preferably larger than 100 measurements, more preferably larger than 1000 measurements, or user-adjustable. It is thereby possible to achieve a very low time duration of the measurement.

Alternatively, the number N of measurements, after which the power alignment determination unit is adapted to determine the power of the first carrier and the power of the second carrier are in alignment, is adaptively determined by the control unit based upon the results of the measurements performed by the measuring unit. It is thereby possible to react upon the determined measuring results. For example, in case of measuring results indicating a barely sufficient power alignment, a low number N of measurements, after which a further power alignment check is performed, can be set. On the other hand, in case of an optimal power alignment over a number of consecutive power alignment checks in the past, a high number N of measurements, after which a further power alignment check is performed, can be set. An optimal balance of measuring time duration and measuring result quality can thereby be achieved.

According to another aspect of the invention, a measuring method serves the purpose of performing measurements of a measuring signal generated by a device under test. The measuring signal uses carrier aggregation of at least a first carrier and a second carrier. The measuring method comprises receiving the measuring signal comprising the first carrier and the second carrier, performing measurements on the received measuring signal, assuming an alignment of a power of the first carrier and a power of the second carrier, and determining, based upon results of the measurements, whether the power of the first carrier and the power of the second carrier are in alignment, and discarding the results of the measurements, if a lack of alignment of the power of the first carrier and the power of the second carrier is determined. A significant reduction in measuring time duration can thereby be achieved.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
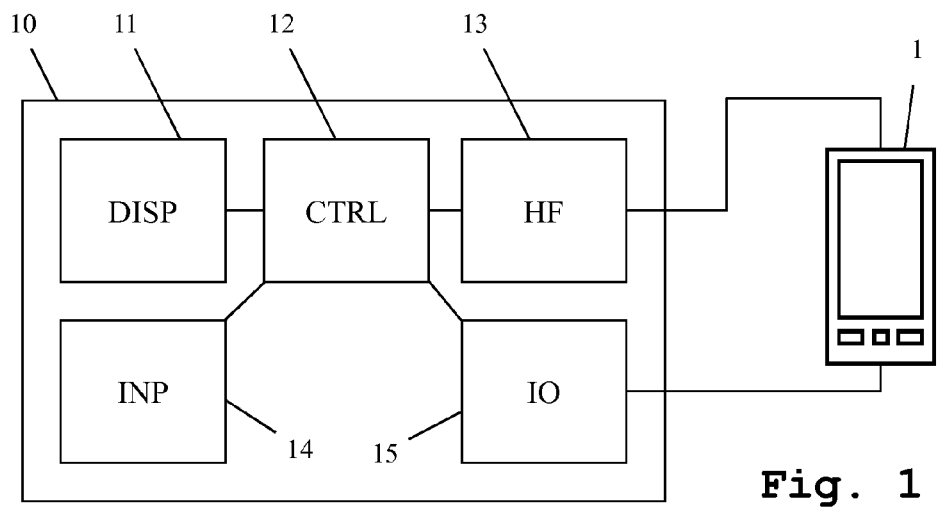
FIG. 1 shows an embodiment of the inventive measuring device in a block diagram.
Figure 2:
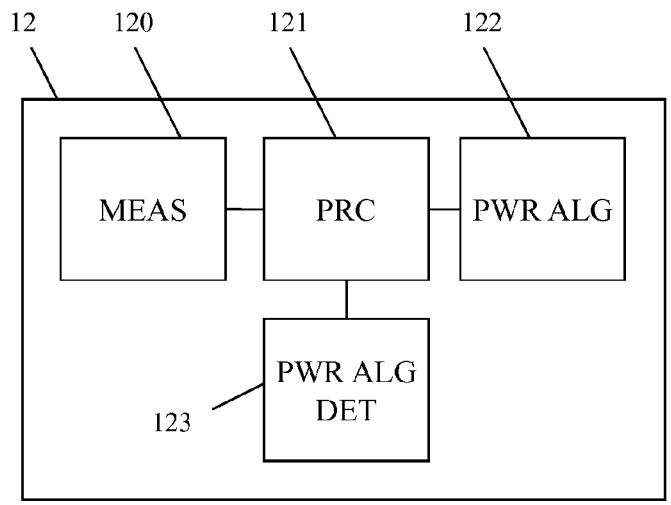
FIG. 2 shows a detail of the embodiment of the inventive measuring device in a block diagram.

First, we demonstrate the construction and function of an embodiment of the inventive measuring device along FIGS. 1-2. After this, we describe the function of an embodiment of the inventive measuring method in detail along FIG. 3. Finally, with regard to FIG. 4, the achievable measuring time duration gain is shown. Similar entities and reference numbers and different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, an embodiment of the inventive measuring device 10 is shown. The measuring device 10 is connected to a device under test 1, in this case a mobile telephone. The measuring device 10 comprises a display unit 11, which is connected to a control unit 12. Furthermore connected to the control unit, the measuring device 10 comprises a high-frequency unit 13, an input unit 14 and a communication unit 15.

The high-frequency unit 13 is connected to a radio frequency output of the device under test 1. The communication unit 15 is connected to a communication input of the device under test 1. These connections can be wired connections, as depicted here, but can alternatively also be implemented as wireless connections.

Regarding the function of the measuring device 10, it is referred to our further elaborations regarding FIG. 2.

In FIG. 2, further details of the embodiment of the inventive measuring device 10 shown in FIG. 1 are depicted. Here, the internal workings of the control unit 12 of FIG. 1 are shown. The control unit 12 comprises a measuring unit 120, which is connected to a processing unit 121. The processing unit 121 is furthermore connected to a power alignment unit 122 and to a power alignment determination unit 123.

The input unit 14 serves the purpose of allowing a user to control the measuring device 10. The display unit 11 can display dialogs and/or measuring results.

After connecting the device under test 1 to the measuring device 10, the control unit 12 instructs the communication unit 15 to instruct the device under test 1 to begin transmitting a measuring signal. The measuring signal uses carrier aggregation of at least a first carrier and a second carrier. This means that the device under test 1 transmits two different carrier signals as part of the measuring signal. The measuring signal is received by the high-frequency unit 13. The high-frequency unit 13 performs a pre-processing including, but not limited to, for example a frequency reduction, a filtering, and an analog-digital-conversion. The resulting pre-processed measuring signal is handed to the measuring unit 120 of the control unit 12, which performs measurements on the received measuring signal. These measurements are performed no matter what the power alignment of the first and the second carrier is. At this point, no initial information regarding the power alignment is available to the measuring device 10.

While performing these measurements, in parallel, the power alignment determination unit 123 determines, as soon as first measuring results are available, based upon results of the measurements performed by the measuring unit, if the power of the first carrier and the power of the second carrier are in alignment. This determination requires a significant amount of time. Therefore, the results of the power alignment determination unit are only available after the respective measurements are completed and further measurements are being performed. If the result of the power alignment determination is that the power of the first carrier and the power of the second carrier are in alignment, the results of the already performed measurements are stored as valid measurement results. In case of a lack of alignment of the power of the first carrier and the power of the second carrier, the measurement results are discarded. The same measurements are then repeated later on.

Such a power alignment determination by the power alignment determination unit 123 is performed repeatedly. For example, after N measurements have been performed, a power alignment determination is performed by the power alignment determination unit 123. The number N can be pre-specified. Alternatively, it can be user-adjustable. Also, an automatic adaption of the value N depending upon the previous measuring results is possible. For example, in case of various stable and nearly identical powers of the first and second carrier, the number N can be increased. In case of very unstable powers of the carriers, which only barely meet the power alignment criterion, the number N can be reduced.

When discarding measuring results, all measuring results of measurements, which have been performed after the measurements, based upon which the power alignment determination unit has last determined no lack of alignment of the power of the first carrier and the power of the second carrier. This means that measuring results slightly pre-dating the last power alignment determination up until the present time are discarded.

In case such a lack of power alignment is detected by the power alignment determination unit 123, the control unit 12 performs a power alignment by performing an iterative process. Especially, it is determined, which increase or decrease of the power of the first carrier and/or the power of the second carrier is necessary to achieve an alignment of the power of the first carrier and the second carrier. Afterwards, the device under test is instructed by use of the communication unit to perform the according power adjustment. Afterwards, the power alignment determination unit determines, if now a power alignment of the first carrier and the second carrier has been reached. These steps are repeated, until the power of the first carrier and the power of the second carrier are in alignment.

Since this process though only has to be performed, if a lack of power alignment is detected, overall a significant reduction in time of measurement can be achieved.

Second Embodiment

Figure 3:
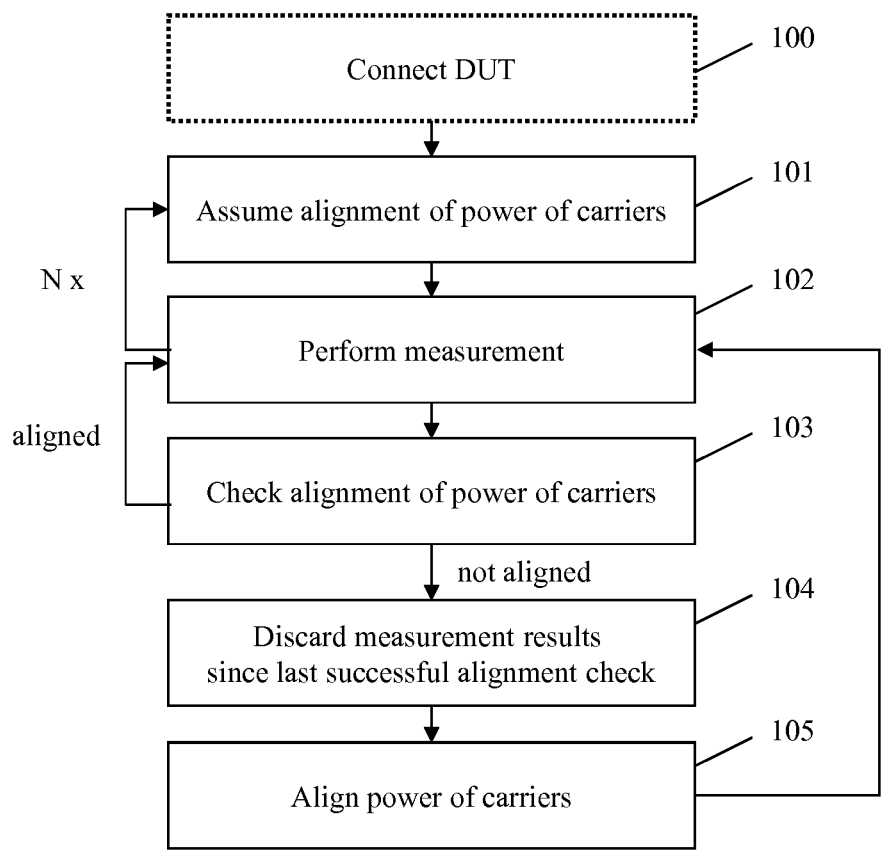
FIG. 3 shows an embodiment of the inventive measuring method in a flow diagram.

In FIG. 3, an embodiment of the inventive measuring method is depicted in a flow diagram. In an optional first step 100, the device under test is connected to a measuring device. In a second step 101, an alignment of the powers of the carriers is assumed. This step is no factual step, but merely means that although no previous information regarding an alignment of the power of the carriers is available, for the further processing a positive alignment of the power of the carriers is taken as a fulfilled precondition.

In a third step 102, a measurement is performed by receiving and measuring a part of the measuring signal emitted by the device under test. The step 102 is repeated N times. After N measurements have been performed, in a fourth step 103, the alignment of the power of the carriers is checked.

In case, the powers of the carriers are in alignment, a further set of N measurements is performed and it is continued with step 102.

In case, the power of the carriers is not aligned, a fifth step 104 is initiated. The fifth step 104 comprises discarding measurement results since the last successful power alignment check. This means that all measurement results, which have been performed under the false pretense of power alignment are discarded and respective measurements are later repeated. In a sixth step 105, an alignment of the power of the carriers is performed. For this, for example an iterative alignment comprising repeated power adaptation and measurement can be used. After the powers of the carriers have been brought into alignment, it is continued with step 102, where a further set of N measurements is performed.

Figure 4:
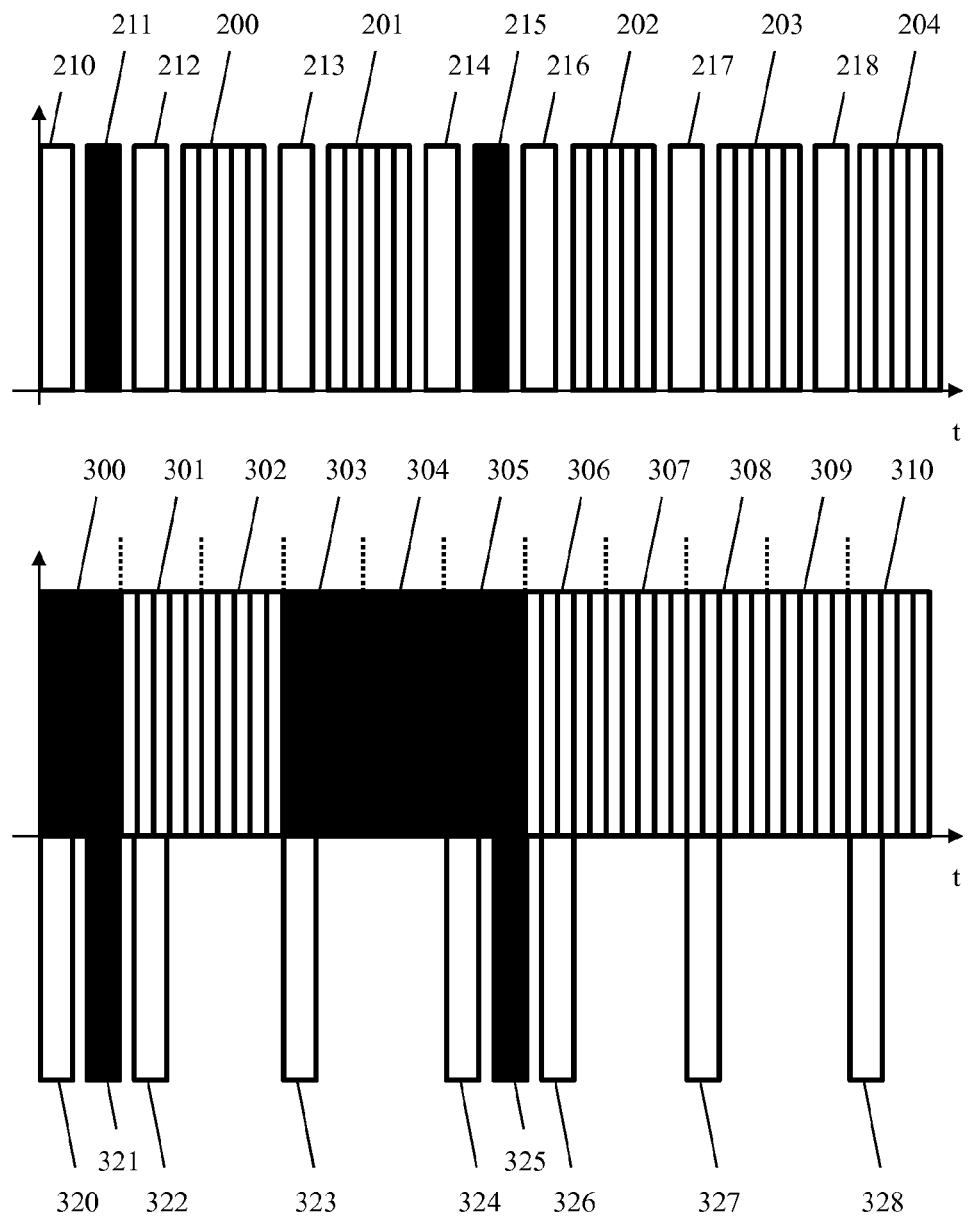
FIG. 4 shows an exemplary time-diagram comparing the time consumption of an embodiment of the inventive measuring method or measuring device to the time consumption of a regular measuring device or method.

In FIG. 4, a comparison of the time consumption for performing the measurement using embodiments of the inventive measuring method or device to regular measuring methods is shown. On the top, a regular measuring method is depicted. On the x-axis, the time consumption of individual processing steps is shown. In a first step 210, a power alignment of the carriers is checked. Here, a lack of alignment is determined in a step 211 and a power alignment is performed. The success of this is checked in step 212. Since this check gives back a positive result, measurements 200 are performed. After the measurements 200 are performed, a further power alignment check 213 is performed. Also this check gives a positive result, allowing to perform further measurements 201. Again, a power alignment check 214 is performed. Since this check gives a negative result, a power alignment 215 is performed. The power alignment is then again checked in step 216, which gives a positive result, and thereby allows further measurements 202. A further power alignment check 217 gives a positive result and allows further measurements 203. Moreover, a last power alignment check 218 gives a positive result and allows further measurements 204.

In total, five blocks of measurements 200-204 have been performed. It is easily recognizable that a significant part of the time has been used for performing power alignment checks and power alignments. In reality, the time required for performing the power alignment checks and power alignments is moreover significantly longer than depicted here. The ratio between performing a power alignment and performing a measurement is in reality about 1000:1.

In the lower part of FIG. 4, a time-diagram of an embodiment of the inventive measuring method or system is shown. Beginning from the start, continuous measurements 300-310 are performed. These measurements 300-310 are not interrupted for power alignment checks or power alignments.

In parallel to performing the measurements 300-310, power alignment checks and power alignments are performed. Especially, starting from the beginning, a power alignment check 320 is performed. This power alignment check gives a negative result resulting in a power alignment 321. The results of this power alignment is checked using a further power alignment check 323, which gives a positive result.

Since the power alignment check 320 gave a negative result, all measuring results from the beginning are invalid and cannot be used. They are discarded. Only from the end of the power alignment step 321, it can reasonably be assumed that power alignment was present, since the power alignment check 323 gave a positive result. After a number N of measurements, a further power alignment check 323 is performed. Also this check gives a positive result, indicating that the previous measurements are valid and can be used. After a number N of measurements, a further power alignment check 324 is performed. This power alignment check 324 though gives a negative result indicating that the measuring results since the last power alignment check with a positive result 323 are invalid and cannot be used. These measuring results are discarded. A new power alignment 325 is performed. Only from the end of this power alignment step 325, the measuring results can be used again. To verify the success of the power alignment 325, a power alignment check 326 is performed.

Again after N measurements, a further power alignment check 327 and after further N measurements, a power alignment check 328 are performed. Since all of these power alignment checks give back a positive result, all measurements 306-310 since the last power alignment 325 can be used. Also here, in reality, the power alignment checks and the power alignments require a significant longer time than depicted here in comparison to the measurements 300-310. Moreover, in reality, the occurrence of a lack of power alignment is rather improbable. Therefore, a far greater number of measurements can be performed, without having to discard measuring results due to a lack of power alignment.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate data with the processor through a variety of known means.

The invention is not limited to the examples. The characteristics of the exemplary embodiments can be used in any combination. Although the present invention and its advantages have been described in detail, it should be understood, that various changes, substitutions and alterations can be made herein without departing from the spirit and scope of the invention as defined by the appended claims.

The invention claimed is:

1. A measuring device for performing measurements of a measuring signal generated by a device under test,
the measuring signal using carrier aggregation of at least a first carrier and a second carrier,
the measuring device comprising a high frequency unit adapted to receive the measuring signal comprising the first carrier and the second carrier, and a control unit comprising:
a measuring unit adapted to perform measurements on the received measuring signal, assuming an alignment of a power of the first carrier and a power of the second carrier, and
a power alignment determination unit adapted to determine, based upon results of the measurements of the measuring unit, whether the power of the first carrier and the power of the second carrier are in alignment,
wherein the control unit is adapted to:
discard at least some of the results of the measurements, if a lack of alignment of the power of the first carrier and the power of the second carrier is determined by the power alignment determination unit, and
discard all results of measurements, which have been performed after the measurements based upon which the power alignment determination unit has last determined no lack of alignment of the power of the first carrier and the power of the second carrier, if a lack of alignment of the power of the first carrier and the power of the second carrier is determined by the power alignment determination unit, and
wherein the measuring unit is adapted to perform further measurements on the received measuring signal in parallel while the power alignment determination unit determines whether the power of the first carrier and the power of the second carrier are in alignment, based upon the measuring results.

2. The measuring device of claim 1,
wherein the measuring unit is adapted to perform the measurements without the measuring device having prior information regarding the alignment of the power of the first carrier and the power of the second carrier.

3. The measuring device of claim 1,
wherein the control unit is adapted to iteratively perform a power alignment of the power of the first carrier and the power of the second carrier, if a lack of alignment of the power of the first carrier and the power of the second carrier is determined by the power alignment determination unit.

4. The measuring device of claim 1,
further comprising:
a communication unit adapted to transmit commands to the device under test,
wherein the control unit further comprises a power alignment unit,
wherein the control unit is adapted to iteratively perform a power alignment of the power of the first carrier and the power of the second carrier, if a lack of alignment of the power of the first carrier and the power of the second carrier is determined by the power alignment determination unit, by repeatedly
determining an increase or decrease of the power of the first carrier and/or the power of the second carrier necessary to achieve an alignment of the power of the first carrier and the power of the second carrier,
instructing the device under test by use of the communication unit, to perform the determined increase or decrease of the power of the first carrier and/or the power of the second carrier,
determining by the power alignment determination unit, if the power of the first carrier and the power of the second carrier are in alignment,
until an alignment of the power of the first carrier and the power of the second carrier is determined by the power alignment determination unit.

5. The measuring device of claim 1,
wherein the power alignment determination unit is adapted to determine, whether the power of the first carrier and the power of the second carrier are in alignment, each time a number N of measurements has been performed by the measuring unit.

6. The measuring device of claim 5,
wherein the number N of measurements, after which the power alignment determination unit is adapted to determine, whether the power of the first carrier and the power of the second carrier are in alignment, is pre-specified, preferably larger than 100 measurements, more preferably larger than 1000 measurements, or user-adjustable.

7. The measuring device of claim 5,
wherein the number N of measurements, after which the power alignment determination unit is adapted to determine whether the power of the first carrier and the power of the second carrier are in alignment, is adaptively determined by the control unit based upon the results of the measurements performed by the measuring unit.

8. A measuring method for performing measurements of a measuring signal generated by a device under test,
the measuring signal using carrier aggregation of at least a first carrier and a second carrier,
the measuring method comprising the following steps:
receiving the measuring signal comprising the first carrier and the second carrier,
performing measurements on the received measuring signal, assuming an alignment of a power of the first carrier and a power of the second carrier,
determining, based upon results of the measurements, whether the power of the first carrier and the power of the second carrier are in alignment,
discarding the results of the measurements, if a lack of alignment of the power of the first carrier and the power of the second carrier is determined,
discarding all results of measurements that have been performed after the measurements based upon which no lack of alignment of the power of the first carrier and the power of the second carrier was last determined, if a lack of alignment of the power of the first carrier and the power of the second carrier is determined, and
performing further measurements on the received measuring signal in parallel while determining whether the power of the first carrier and the power of the second carrier are in alignment based upon the measuring results.

9. The measuring method of claim 8,
wherein the measurements are performed without having prior information regarding the alignment of the power of the first carrier and the power of the second carrier.

10. The measuring method of claim 8,
wherein a power alignment of the power of the first carrier and the power of the second carrier is iteratively performed, if a lack of alignment of the power of the first carrier and the power of the second carrier is determined.

11. The measuring method of claim 8,
wherein a power alignment of the power of the first carrier and the power of the second carrier is iteratively performed, if a lack of alignment of the power of the first carrier and the power of the second carrier is determined, by repeatedly
determining an increase or decrease of the power of the first carrier and/or the power of the second carrier necessary to achieve an alignment of the power of the first carrier and the power of the second carrier,
instructing the device under test to perform the determined increase or decrease of the power of the first carrier and/or the power of the second carrier,
determining whether the power of the first carrier and the power of the second carrier are in alignment,
until an alignment of the power of the first carrier and the power of the second carrier is determined.

12. The measuring method of claim 8,
wherein each time a number N of measurements has been performed, it is determined if the power of the first carrier and the power of the second carrier are in alignment.

13. The measuring method of claim 12,
wherein the number N of measurements, after which it is determined, whether the power of the first carrier and the power of the second carrier are in alignment, is pre-specified, preferably larger than 100 measurements, more preferably larger than 1000 measurements, or user-adjustable.

14. The measuring method of claim 12,
wherein the number N of measurements, after which it is determined, whether the power of the first carrier and the power of the second carrier are in alignment, is adaptively determined based upon the results of the measurements.

* * * * *